(12) United States Patent
Koch

(10) Patent No.: US 8,255,005 B2
(45) Date of Patent: *Aug. 28, 2012

(54) METHODS, SYSTEMS, AND PRODUCTS FOR CUSTOMIZED ALERTS

(75) Inventor: Robert A. Koch, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 367 days.

This patent is subject to a terminal disclaimer.

(21) Appl. No.: 12/430,147

(22) Filed: Apr. 27, 2009

(65) Prior Publication Data

US 2009/0214017 A1 Aug. 27, 2009

Related U.S. Application Data

(63) Continuation of application No. 10/975,322, filed on Oct. 28, 2004, now Pat. No. 7,542,773, which is a continuation-in-part of application No. 10/109,934, filed on Mar. 29, 2002, now Pat. No. 7,729,487.

(51) Int. Cl.
*H04B 1/38* (2006.01)

(52) U.S. Cl. ........... 455/567; 455/466; 455/412.2; 455/414.4

(58) Field of Classification Search .......... 455/466, 455/567, 412.2, 414.4, 414.1, 419, 420, 67.11, 455/67.14; 379/373.01, 373.02, 207.16
See application file for complete search history.

(56) References Cited

U.S. PATENT DOCUMENTS

| | | |
|---|---|---|
| 4,723,271 A | 2/1988 | Grundtisch |
| 4,866,766 A | 9/1989 | Mitzlaff |
| 5,228,080 A | 7/1993 | Nutter et al. |
| 5,371,781 A | 12/1994 | Ardon |
| 5,544,235 A | 8/1996 | Ardon |
| 5,659,596 A | 8/1997 | Dunn |
| 5,872,926 A | 2/1999 | Levac et al. |
| 5,905,774 A | 5/1999 | Tatchell et al. |
| 5,926,537 A | 7/1999 | Birze |
| 5,933,476 A | 8/1999 | Hansen et al. |
| 5,978,451 A | 11/1999 | Swan et al. |
| 6,031,899 A | 2/2000 | Wu |
| 6,178,230 B1 | 1/2001 | Borland |
| 6,121,265 A1 | 4/2001 | Duphorne |
| 6,310,944 B1 | 10/2001 | Brisebois et al. |
| 6,366,791 B1 | 4/2002 | Lin et al. |
| 6,385,303 B1 | 5/2002 | Peterson et al. |
| 6,404,880 B1 | 6/2002 | Stevens |
| 6,418,330 B1 | 7/2002 | Lee |
| 6,519,326 B1 | 2/2003 | Milewski et al. |
| 6,714,637 B1 | 3/2004 | Kredo |
| 6,718,021 B2 * | 4/2004 | Crockett et al. ........... 379/93.23 |
| 6,778,648 B1 | 8/2004 | Alston et al. |
| 6,871,214 B2 * | 3/2005 | Parsons et al. ................ 709/206 |
| 7,012,999 B2 | 3/2006 | Ruckart |
| 7,149,208 B2 * | 12/2006 | Mattaway et al. ............ 370/352 |
| 7,254,219 B1 | 8/2007 | Hansen et al. |
| 7,295,656 B2 | 11/2007 | Ruckart |
| 7,315,618 B1 | 1/2008 | Moton et al. |
| 2002/0115456 A1 | 8/2002 | Narinen et al. |
| 2003/0002486 A1 | 1/2003 | Emerson, III |
| 2003/0033179 A1* | 2/2003 | Katz et al. ........................ 705/7 |
| 2003/0128821 A1 | 7/2003 | Luneau et al. |
| 2004/0088715 A1 * | 5/2004 | Korall et al. .................. 719/318 |

* cited by examiner

*Primary Examiner* — John J Lee
(74) *Attorney, Agent, or Firm* — Scott P. Zimmerman PLLC

(57) ABSTRACT

Methods, systems, and products are disclosed for presenting a custom alert to a recipient of an incoming data communication. A data message is received that specifies the custom alert associated with the data communication. The customer alert is then visually and/or audibly presented to provide notice of the data communication.

20 Claims, 9 Drawing Sheets

METHODS, SYSTEMS, AND PRODUCTS FOR CUSTOMIZED ALERTS

CROSS-REFERENCE TO RELATED APPLICATION

This application is a continuation of U.S. application Ser. No. 10/975,322, filed Oct. 28, 2004, and now issued as U.S. Pat. No. 7,542,773, which is a continuation-in-part of U.S. application Ser. No. 10/109,934, filed Mar. 29, 2002 and now issued as U.S. Pat. No. 7,729,487, with both applications incorporated herein by reference in their entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND

The exemplary embodiments generally relate to communications and, more particularly, to methods, systems, and apparatuses that allow a user to select and to receive custom audio and/or visual alert indicators for incoming communications to a communications device.

DESCRIPTION OF THE RELATED ART

Custom alert indicators, such as ringtones, are popular in wireless telephony. A wireless user can program a wireless telephone to provide different rings for incoming telephone calls. The user is typically provided a selection of ringtones, and the user associates the telephone number of the calling party with a specific ringtone. The user may even download a greater variety of ringtones from the World Wide Web. The custom ringtones differentiate the user's wireless telephone from another person's wireless telephone, and the custom ringtones alert the user to the identity of the calling party.

Although custom ringtones have become very popular, no similar service is commercially offered to provide communications device users the ability to sufficiently customize audio and/or visual alerts to recipients of incoming data communications, such as email, text messaging, and instant messaging.

BRIEF SUMMARY OF THE INVENTION

According to exemplary embodiments, the aforementioned problems and others are reduced by a custom alert module for incoming communications. The custom alert module comprises computer programs, computer systems, and telecommunications systems that allow a user to customize alert indicators for data communication devices. The user may select a desired audio and/or visual alert based upon the time of day, the day of week, the sender's identification, the recipient's identification, or any other user-defined criteria. The desired alert is then preferably presented on the recipient's communication device to provide additional information to the recipient by means of which specific audio and/or visual alert was presented. For example, the recipient may identify, via a particular sound or visual indicator, who sent/initiated the communication, for whom the communication is intended, whether the communication is urgent, or the subject matter of the communication. The custom alert module also provides a convenient and user-friendly web-interface that allows the user to select specific alerts and to specify the conditions for each alert.

According to the exemplary embodiments, a method is provided of selecting customized audio/visual alert indicators for alerting the recipient of a communication at a data communication device of the nature of the communication. The data communication device may be any type of device that is capable of communicating data messages, such as emails, text messages, and instant messages, from a sending party to a receiving party. Accordingly, a communication device may be a computer, a telephone, a pager, or any other device that is capable of sending and receiving data messages. The communication device may also be addressable by means of a data address, such as an IP address or a URL. The communication device may also be capable of displaying files that are presented in an audio and/or visual format. Audio/visual formatted file types include, but are not limited to, WAV, MPEG, GIF, JPEG, and MP3. An incoming message is received from a sender, and the message is addressed to a recipient. An audio/visual alert is determined, and a data message is sent over a data network to the recipient's communication device. The data message includes information associated with the selected audio/visual alert. Based on this information, the recipient's communication device presents the proper audio/visual alert to the recipient. The incoming message is then delivered to the recipient's communication device.

Another of the exemplary embodiments describes another method for presenting a custom alert to a recipient of an incoming data communication. Here a data communication is received from a sender. A custom alert is determined, where the customer alert is to be presented on the recipient's communication device based on pre-defined rules established by the recipient. The custom alert is then presented to the recipient to accompany the data communication.

Yet another of the exemplary embodiments describes a data communications system. The system includes a database that stores audio/visual custom alert files. The data communications system processes a communication from a sender to a recipient and additionally sends a data message to the recipient. This data message includes information associated with a selected custom alert, as pre-specified by the recipient, to accompany the communication.

Still another of the exemplary embodiments describes method for presenting a custom alert to a recipient of a data communication. Here a data communication is received, with the data communication initiated by a sender and intended for the recipient. A custom alert to be presented to the recipient is determined, and the customer alert is based on pre-defined rules established by the recipient. Information regarding the custom alert is communicated to the recipient, and the data communication is forwarded to the recipient. The information may be a file that, when executed, presents audio and/or visual content. The information regarding the custom alert may additionally or alternatively include a reference to a file stored on the recipient's communication device that, when executed, presents the custom alert. The pre-defined rules may specify the custom alert based on the sender's data address or based on the recipient's data address.

Still more of the exemplary embodiments include an apparatus that generates custom audio/visual alerts for incoming communications. The apparatus includes a port, memory, and a processor. The port receives a data communication from a data network. The memory stores a selection of custom alerts to accompany a data communication from a sender. The processor communicates with the memory and selects a custom alert based upon information contained in the data communication received from the data network. The custom alert, when executed, may results in presentation of audio and/or visual content. The apparatus may include a display for presentation of visual content and a speaker for presentation of audio content.

BRIEF DESCRIPTION OF THE SEVERAL
VIEWS OF THE DRAWINGS

These and other features, aspects, and advantages of the exemplary embodiments are better understood when the following Detailed Description is read with reference to the accompanying drawings, wherein.

DETAILED DESCRIPTION

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

According to the exemplary embodiments, a custom alert module comprises computer programs, computer systems, and communications systems that allow a user to customize alerts for data communication devices. The user may select a desired audio and/or visual alert based upon the time of day, the day of week, the sender's identification, the recipient's identification, or any other user-defined criteria. The desired alert is then preferably presented on the recipient's communication device to provide additional information to the recipient by means of which specific audio and/or visual alert was presented. For example, the recipient may identify, via a particular sound or visual indicator, who sent/initiated the communication, for whom the communication is intended, whether the communication is urgent, or the subject matter of the communication. The custom alert module also provides a convenient and user-friendly web-interface that allows the user to select specific alerts and to specify the conditions for each alert.

Figure 1:
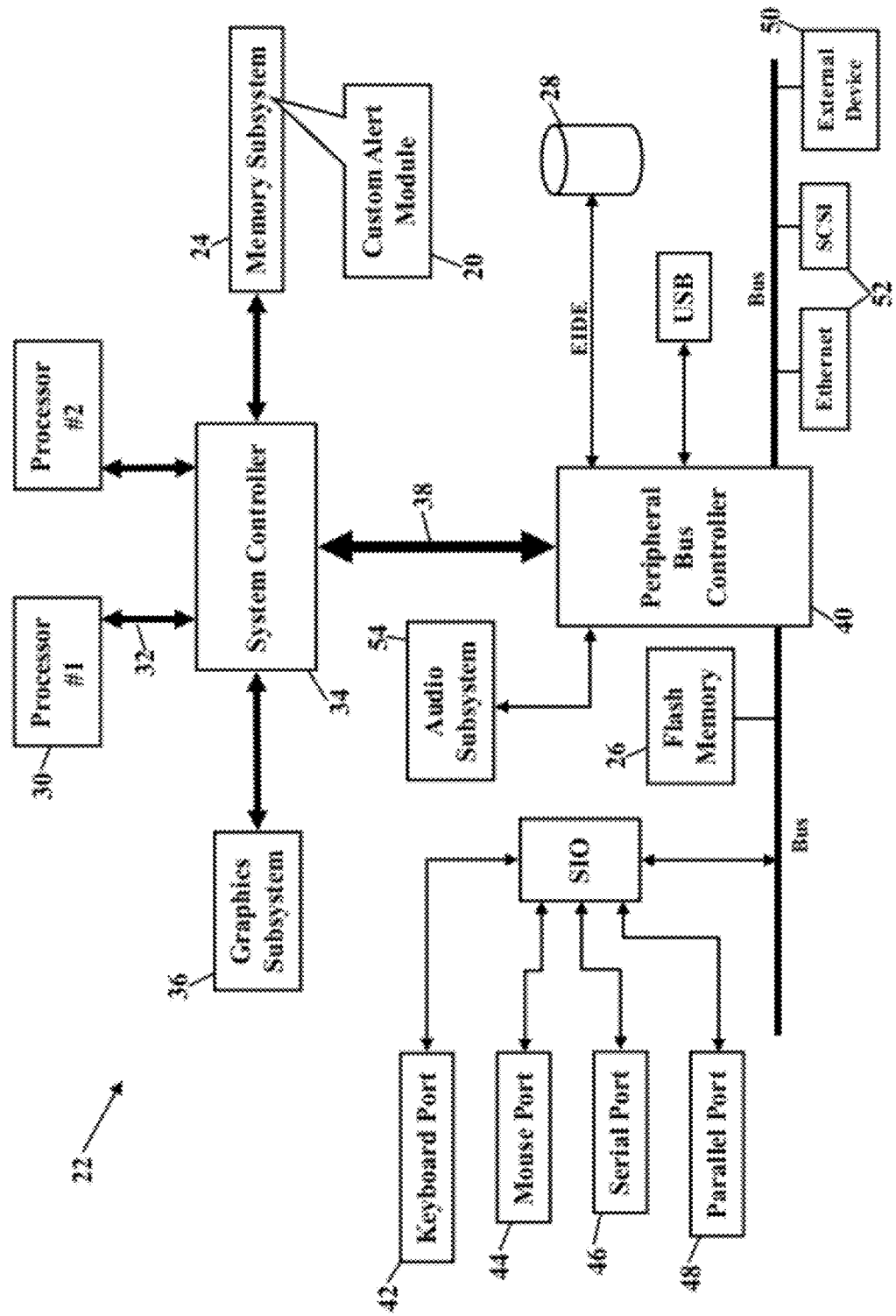
FIG. 1 is a block diagram showing one embodiment of the custom alert module that resides in a computer system.
Figure 2:
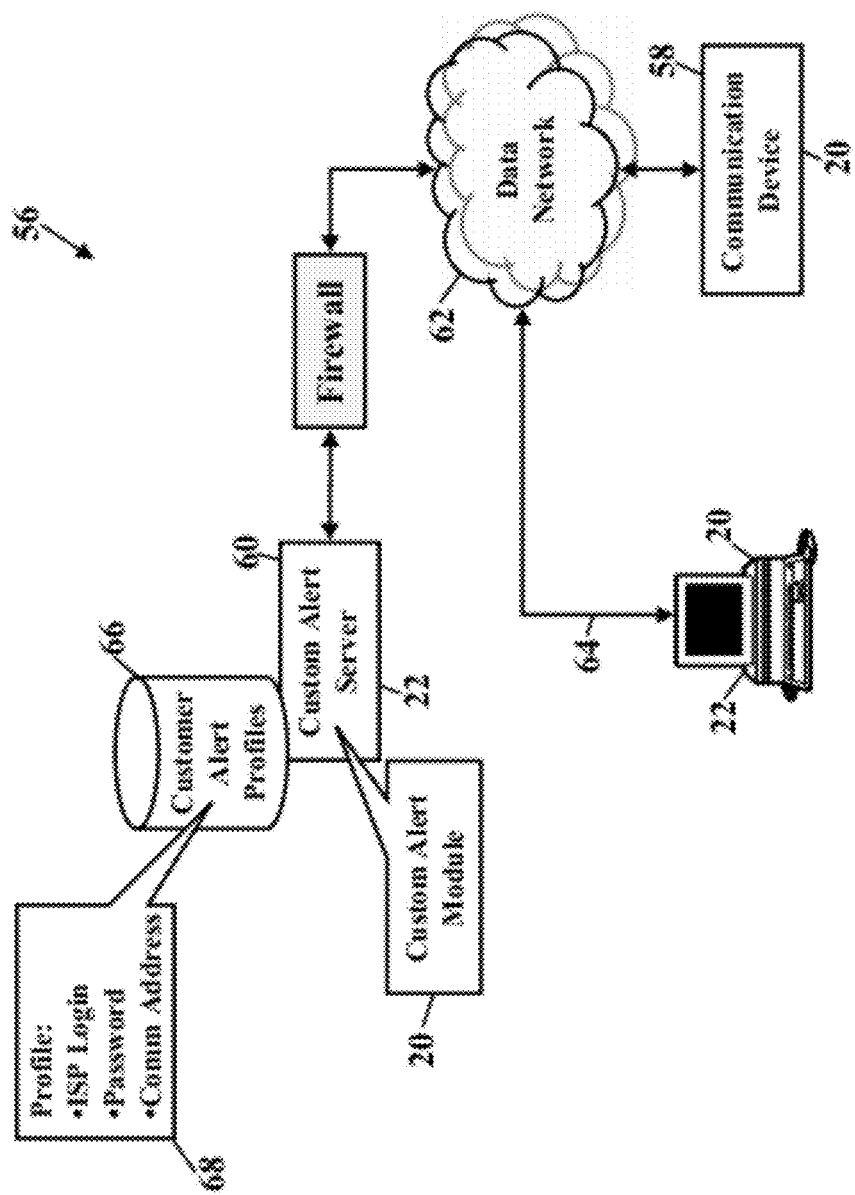
FIG. 2 is a schematic showing the custom alert module operating within a communications system.

FIGS. 1 and 2 depict possible operating environments for some of the exemplary embodiments. This embodiment of a custom alert module 20 includes a computer program that allows a user to customize alerts for incoming communications. The custom alert module 20 allows the user to select a desired alert based upon the time of day, the day of week, the email and/or Internet Protocol address of the sender/recipient, or many other subscriber-defined criteria. The selected alert may include a note, a sound, a song, a graphic, an animation, and/or a sound to accompany an incoming communication. When an incoming communication is received at the recipient's communication device, the selected alert is audibly and/or visually presented on the recipient's communication device. The desired alert provides additional information to the recipient by means of which specific audio and/or visual alert is presented. For example, the recipient may identify, via a particular sound or visual indicator, who sent/initiated the communication, for whom the communication is intended, whether the communication is urgent, or the subject matter of the communication.

FIG. 1 is a block diagram showing the custom alert module 20 residing in a computer system 22. The custom alert module 20 operates within a system memory device. The custom alert module 20, for example, is shown residing in a memory subsystem 24. The custom alert module 20, however, could also reside in flash memory 26 or peripheral storage device 28. The computer system 22 also has one or more central processors 30 executing an operating system. The operating system, as is well known, has a set of instructions that control the internal functions of the computer system 22. A system bus 32 communicates signals, such as data signals, control signals, and address signals, between the central processor 30 and a system controller 34 (typically called a "Northbridge"). The system controller 34 provides a bridging function between the one or more central processors 30, a graphics subsystem 36, the memory subsystem 24, and a PCI (Peripheral Controller Interface) bus 38. The PCI bus 38 is controlled by a Peripheral Bus Controller 40. The Peripheral Bus Controller 40 (typically called a "Southbridge") is an integrated circuit that serves as an input/output hub for various peripheral ports. These peripheral ports could include, for example, a keyboard port 42, a mouse port 44, a serial port 46 and/or a parallel port 48 for a video display unit, one or more external device ports 50, and networking ports 52 (such as SCSI or Ethernet). The Peripheral Bus Controller 40 could also include an audio subsystem 54. Those of ordinary skill in the art understand that the program, processes, methods, and systems described in this patent are not limited to any particular computer system or computer hardware.

The processors 30 may be a digital signal processor (DSP) and/or a microprocessor. Advanced Micro Devices, Inc., for example, manufactures a full line of microprocessors (Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Texas Instruments offers a wide variety of digital signal processors (Texas Instruments, Incorporated, P.O. Box 660199, Dallas, Tex. 75266-0199, Phone: 972-995-2011, www.ti.com) as well as Motorola (Motorola, Incorporated, 1303 E. Algonquin Road, Schaumburg, Ill. 60196, Phone 847-576-5000, www.motorola.com). There are, in fact, many manufacturers and designers of digital signal processors, microprocessors, controllers, and other componentry that are described in this patent. Those of ordinary skill in the art understand that the concepts disclosed herein may be implemented using any design, architecture, and manufacture. Those of ordinary skill in the art, then understand that this invention is not limited to any particular manufacturer's component, nor architecture, nor manufacture.

The preferred operating system is WINDOWS® (WINDOWS® is a registered trademark of Microsoft Corporation, One Microsoft Way, Redmond Wash. 98052-6399, 425.882.8080, www.Microsoft.com). Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 24, flash memory 26, or peripheral storage device 28) may also contain an application program. The application program cooperates with the operating system and with a video display unit (via the serial port 46 and/or the parallel port 48) to provide a Graphical User Interface (GUI). The Graphical User Interface typically includes a combination of signals communicated along the keyboard port 42 and the mouse port 44. The Graphical User Interface provides a convenient visual and/or audible interface with a user of the computer system 22.

FIG. 2 is a schematic showing the custom alert module operating within a communications system 56. This telecommunications system 56 further represents an operating environment for the custom alert module 20. The custom alert module 20 operates within the memory (such as memory subsystem 24, flash memory 26, or peripheral storage device 28 shown in FIG. 1) of the computer system 22. The custom alert module 20 could alternatively operate with the memory of an alternate communication device 58, such as an Internet Protocol (IP) phone or PDA. The communications system 56 includes a custom alert server 60 communicating with a data network 62. The computer system 22 also communicates with the data network 62 via a connection 64, thus receiving packetized data messages from the data network 62. The custom alert module 20 may, therefore, be downloaded via the data network 62 from the custom alert server 60, thus allowing the user/subscriber to configure their custom alert service. Some portions, or all, of the custom alert module 20 may alternatively or additionally operate within the custom alert server 60.

The custom alert module 20 is used to establish a custom alert profile. The custom alert server 60 stores a database 66 of customer alert profiles. A user interacts with the custom alert module 20 and with the computer system 22 to access the custom alert server 60, to login to the custom alert server 60, and to establish a profile 68 in the database 66 of customer alert profiles. As FIG. 2 shows, the profile 68 could contain, for example, the user's Internet Service Provider (ISP) login information, a password, and a communications address (such as an IP address, an email address, another data address, and/or a phone number).

Figure 3:
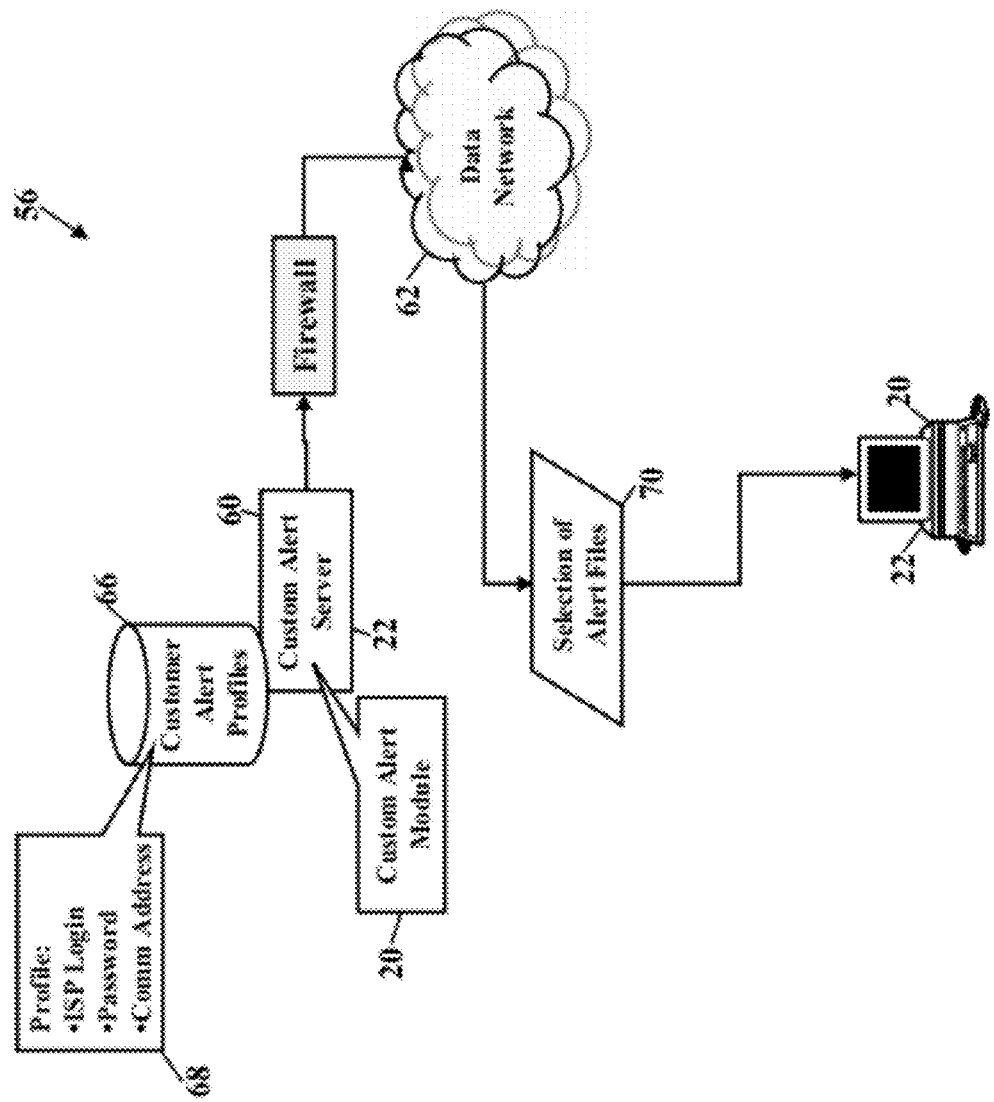
FIG. 3 is a schematic illustrating the selection of alerts according to one of the exemplary embodiments.

FIG. 3 is a schematic illustrating the selection of alerts. After the user establishes the profile 68 in the database 66 of customer alert profiles, the user interacts with the custom alert module 20 to download a selection 70 of alert files. These alert files may also come from another source, e.g., downloaded from the World Wide Web. The selection 70 of alert files is communicated from the custom alert server 60, via the data network 62, to the computer system 22. The selection 70 of alert files could include any note, sound, or song file that the user might desire in a file format that can be interpreted by the custom alert module 20 for presentation to the called party. The selection 70 of alert files, however, could also include graphics files and animation files that would be executed by the computer system 22 and visually and/or audibly presented at the computer system 22. The selection 70 of alert files are then stored within the memory (such as memory subsystem 24, flash memory 26, or peripheral storage device 28 shown in FIG. 1) of the computer system 22. The selection 70 of alert files preferably resides in the same directory structure as the custom alert module 20.

Figure 4:
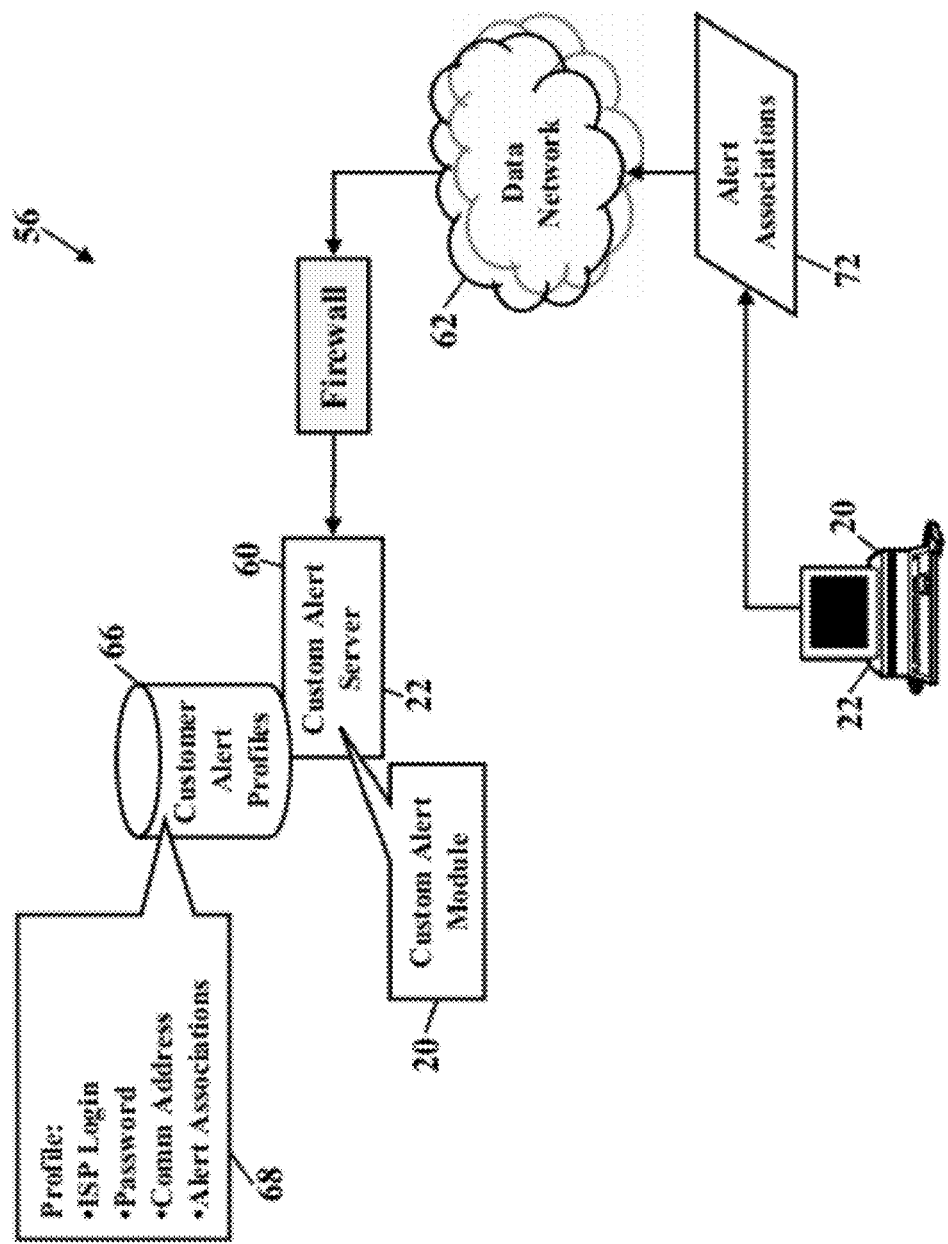
FIG. 4 is a schematic showing a user may customize the alerts according to the exemplary embodiments.

FIG. 4 is a schematic showing how the user may customize the alerts. After the user has downloaded their selection of alert files (shown as reference numeral 70 in FIG. 3), the user interacts with the custom alert module 20 to customize their alerts. The custom alert module 20, in other words, allows the user to select which alert is visually and/or audibly presented and under what conditions that alert is presented. The custom alert module 20 determines which custom alert is to be presented based on pre-defined rules established by the recipient. The custom alert module 20 allows the user to select a different alert file based upon the time of day and/or the day of week. The user, for example, could select a first alert file for communications received between 8-12 each morning, while a second alert file is selected only for communications received on Friday afternoons. The custom alert module 20 also allows the user to associate alerts with communications addresses. The user, for example, could select a third alert file when the sending party is a work-related phone number or communications address, a fourth alert file when the sending party is a spouse's cell phone number or communications address, and a fifth alert file when the sending party is the grandparent's phone number or communications address. The custom alert module 20 also allows the user to select unique alerts for unlisted/unknown telephone numbers or communications addresses, for CallerID-Blocked telephone numbers, for "private" telephone numbers or communications addresses, and for "out-of area" telephone numbers.

Once the user has customized the alerts, the custom alert module 20 communicates alert associations 72 to the custom alert server 60. The alert associations 72 represent the user's customized alerts. The alert associations 72 are communicated via the data network 66 to the custom alert server 60. The profile 78 is then updated with the user's alert associations 72.

Figure 5:
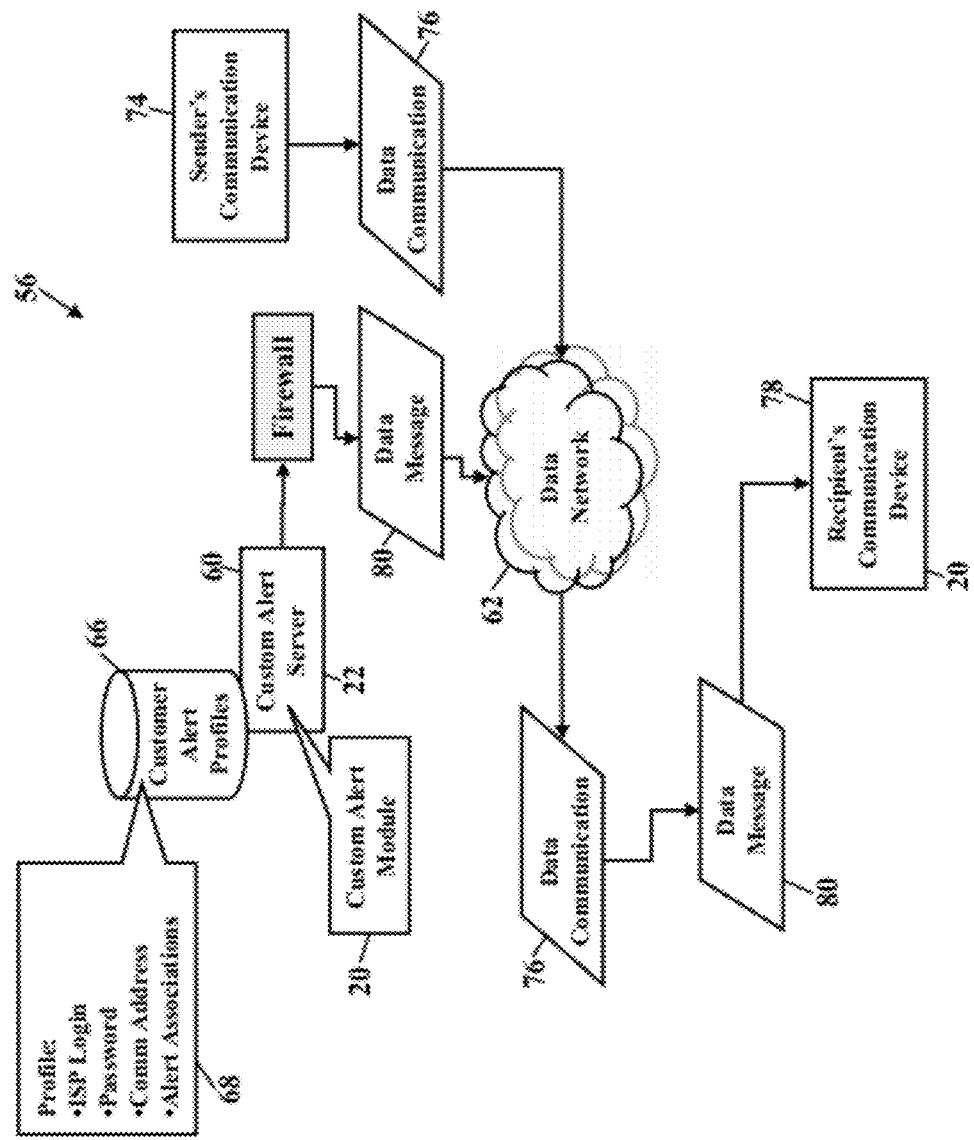
FIGS. 5 and 6 are schematics illustrating the processing of an incoming communication according to the exemplary embodiments.

FIG. 5 is a schematic illustrating the processing of an incoming communication. A sending party uses a sender's communications device 74 to send a data communication 76 to the recipient's communications device 78 via the data network 62. Because the recipient subscribes to this custom alert service, processing of the data communication 76 is suspended and a query is sent to the custom alert server 60 for the appropriate alert. The custom alert server 60 accesses the subscribing user's profile 68, reads the subscribing user's alert associations, and selects which alert is appropriate.

Once the appropriate alert is selected, the custom alert server 60 then requests that the appropriate alert be presented with the incoming communication 76. If the user has a static communications address (such as a static Internet Protocol address, email address, or telephone number), this communication address will usually be known from the user's profile 68. The custom alert server 60, therefore, sends a data message 80 to the recipient's communications device 78. The data message 80 includes information associated with the selected alert. The data message 80 is addressed to the communications address of the recipient's communications device 78. The data message 80 routes from the custom alert server 60 to the recipient's communications device 78 via the data network 62. The recipient's communications device 78 receives the data message 80 and reads the information associated with the selected custom alert. The selected alert file is then audibly and/or visually presented at the recipient's communications device 78. Once the selected alert is presented at the recipient's communications device 78, processing resumes and the incoming communication 76 is sent to the recipient's communications device 78.

The recipient's communications device 78 plays the selected alert. If the selected alert file resides in the recipient's communications device 78, the data message 80 may tell the recipient's communications device 78 (e.g., the custom alert module 20) which alert to play. The data message 80 may include any protocol and/or information that is appropriately understood for presenting the custom alert. Once the data message 80 is received, the custom alert module 20 stored within the recipient's communications device 78 presents the alert to the user. The custom alert module 20 and the recipient's communications device 78, for example, could cause the alert to be audibly presented over a pair of speakers. If the alert has graphical and/or animation content, the custom alert module 20 and the recipient's communications device 78 could also visually present the alert on a video display.

The user may also specify when the alert is presented. The user may have the custom alert module 20 present the alert prior to receipt of the incoming communication 76. If the alert is presented prior to receipt of the incoming communication 76, the alert would give the user advance notice of the sending party. The user could, alternatively, have the custom alert module 20 simultaneously, or nearly simultaneously, present the alert with the incoming communication 76.

Figure 6:
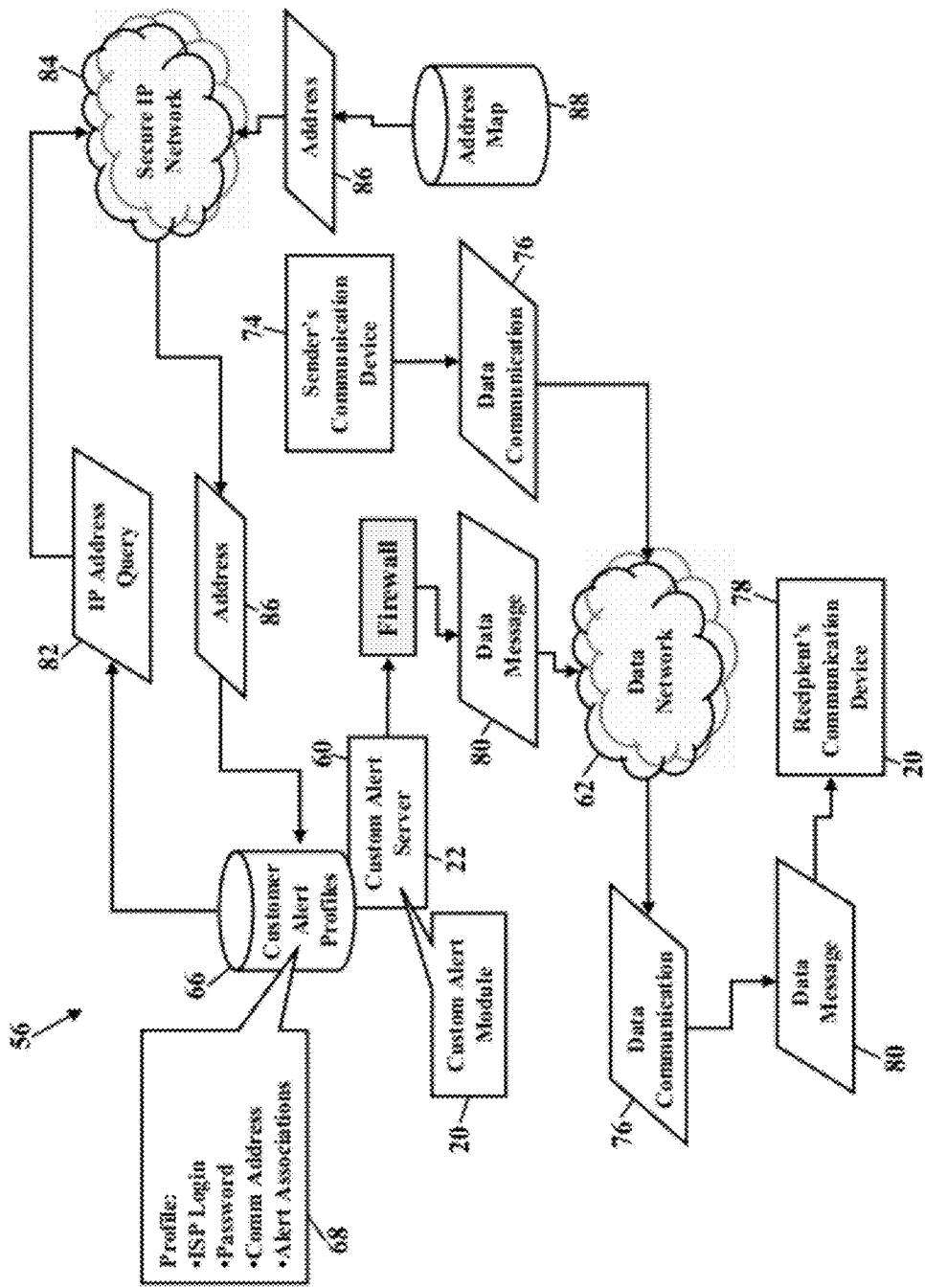

FIG. 6 is also a schematic illustrating a processing flow. FIG. 6 differs from FIG. 5, however, in that FIG. 6 illustrates dynamic communication addressing. Some recipients may have a dynamic communication address. A static communication address (such as static Internet Protocol address) is permanently assigned to the user, while a dynamic Internet Protocol address may change with each login or may dynamically change during a session. FIG. 6 illustrates additional queries that are made for dynamic addressing.

The sending party uses the sender's communications device 74 to send the data communication 76 to the recipient's communications device 76 8 via the data network 62. Because the recipient subscribes to this custom alert service, processing of the data communication 76 is suspended and a query is sent to the custom alert server 60 for the appropriate alert. The custom alert server 60 accesses the subscribing user's profile 68, reads the subscribing user's alert associations, and selects which alert is appropriate. Once the appropriate alert is selected, the custom alert server 60 then prepares to send the data message 80 to the recipient's communications device 78. The data message 80 includes information associated with the selected alert.

Before the data message 80 can be sent, however, the dynamic communication address of the recipient's communications device 78 must be determined. An address query 82 is sent from the custom alert server 60, routed over a secure data network 84, and to a Service Provider serving the recipient's communications device 78. The address query 82 requests the current data address assigned to the recipient's communications device 78. FIG. 6 shows the current address 86 being retrieved from a database 88 that maps users to addresses. The current address 86, for example, could be determined from the Service Provider's login information. If the ISP login information contained within the profile 68 matches the Internet Service Provider's login information, then the custom alert server 60 could have access to the database 88.

Regardless of how the communication address is accessed, the current data address 86 is returned. The current data address 86 routes over the secure network 84 and to the custom alert server 60. With the current address known, the custom alert server 60 may now send the data message 80. The data message 80, including information associated with the selected alert, is sent to the data address of the recipient's communications device 78.

Figure 7:
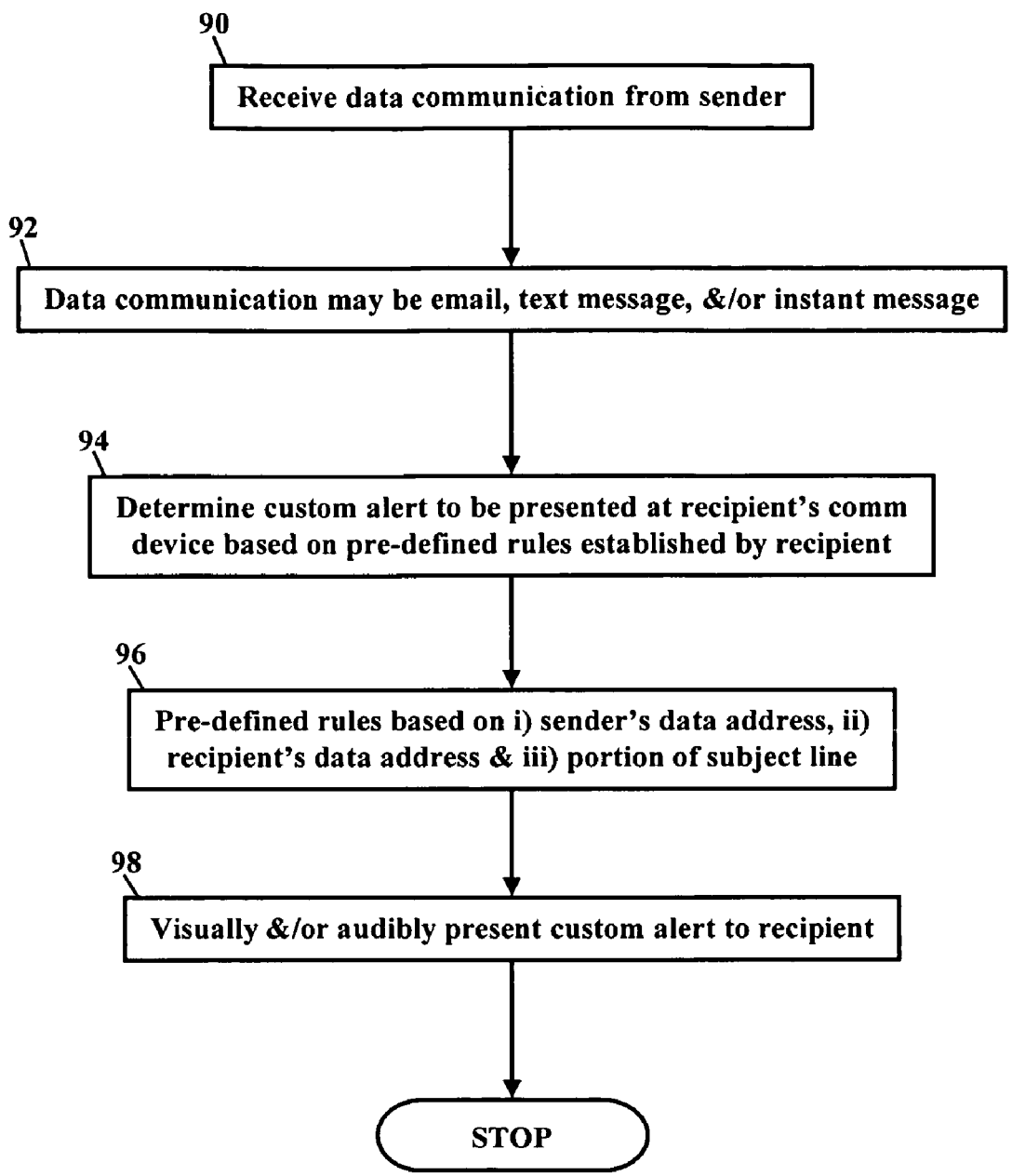
FIG. 7 is a flowchart showing one method of presenting a custom alert to a recipient of an incoming data communication.

FIG. 7 is a flowchart showing one method of presenting a custom alert to a recipient of an incoming data communication. A data communication is received from a sender (Block 90). The data communication may be an email, a text message, and/or an instant message (Block 92). A custom alert to be presented on the recipient's communication device is determined based on pre-defined rules established by the recipient (Block 94). The pre-defined rules may specify the custom alert based on one or more of i) the sender's data address, ii) the recipient's data address, and iii) at least a portion of the subject line of the communication (Block 96). The custom alert is visually and/or audibly presented to the recipient (Block 98).

Figure 8:
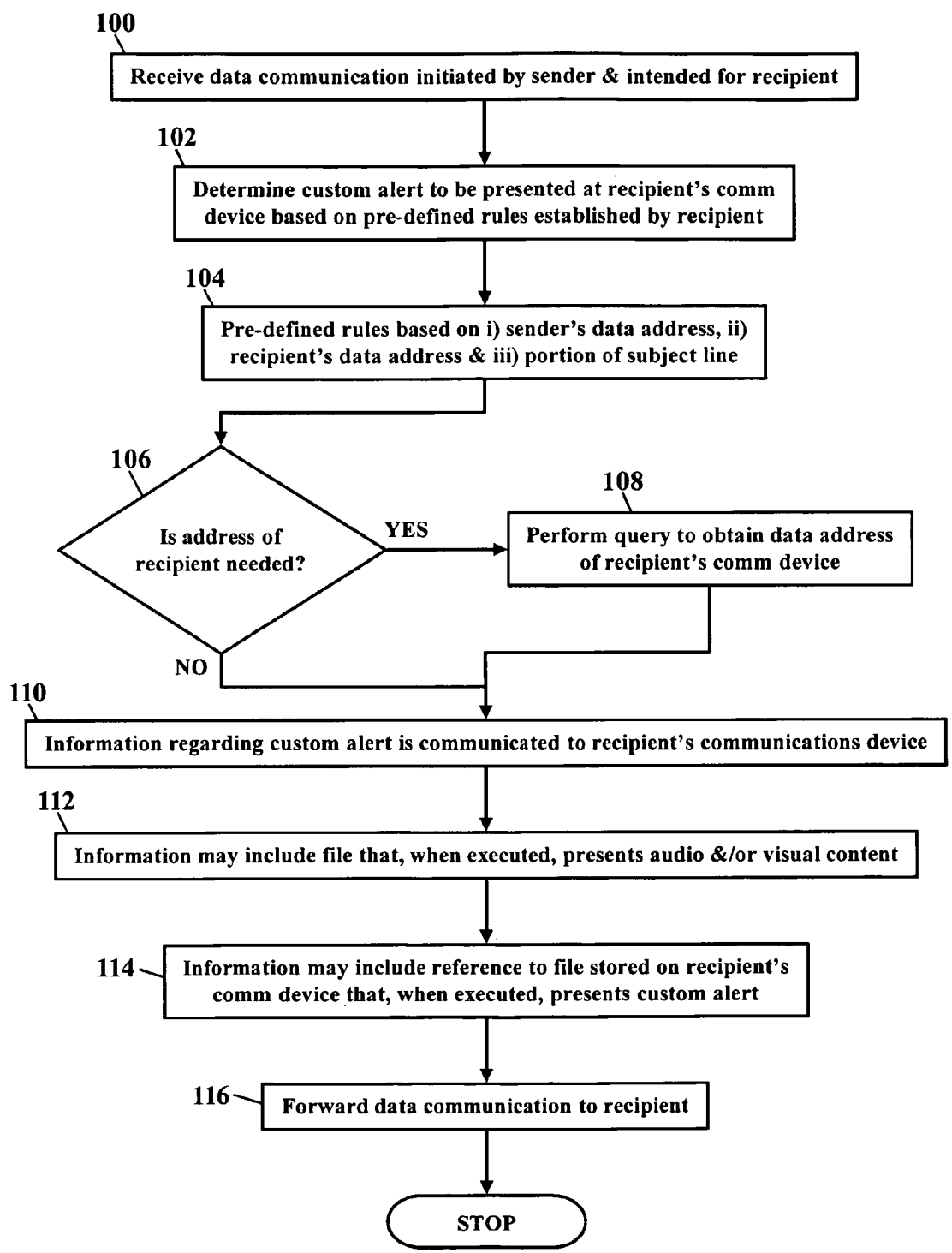
FIG. 8 is a flowchart showing an alternative method for presenting a custom alert to a recipient of a data communication.

FIG. 8 is a flowchart showing an alternative method for presenting a custom alert to a recipient of a data communication. A data communication is received (Block 100), and the data communication is initiated by a sender and intended for the recipient. A custom alert to be presented to the recipient is determined based on pre-defined rules established by the recipient (Block 102). The pre-defined rules may specify the custom alert based on one or more of i) the sender's data address, ii) the recipient's data address, and iii) at least a portion of the subject line of the communication (Block 104). If an address of the recipient is needed (Block 106), one or more queries are performed to obtain a data address of the recipient's communications device (Block 108). Information regarding the custom alert is communicated to the recipient communications device (Block 110). The information regarding the custom alert may include a file that, when executed, presents audio and/or visual content (Block 112). The information regarding the custom alert may additionally or alternatively include a reference to a file stored on the recipient's communication device that, when executed, presents the custom alert (Block 114). The data communication is forwarded to the recipient (Block 1116).

Figure 9:
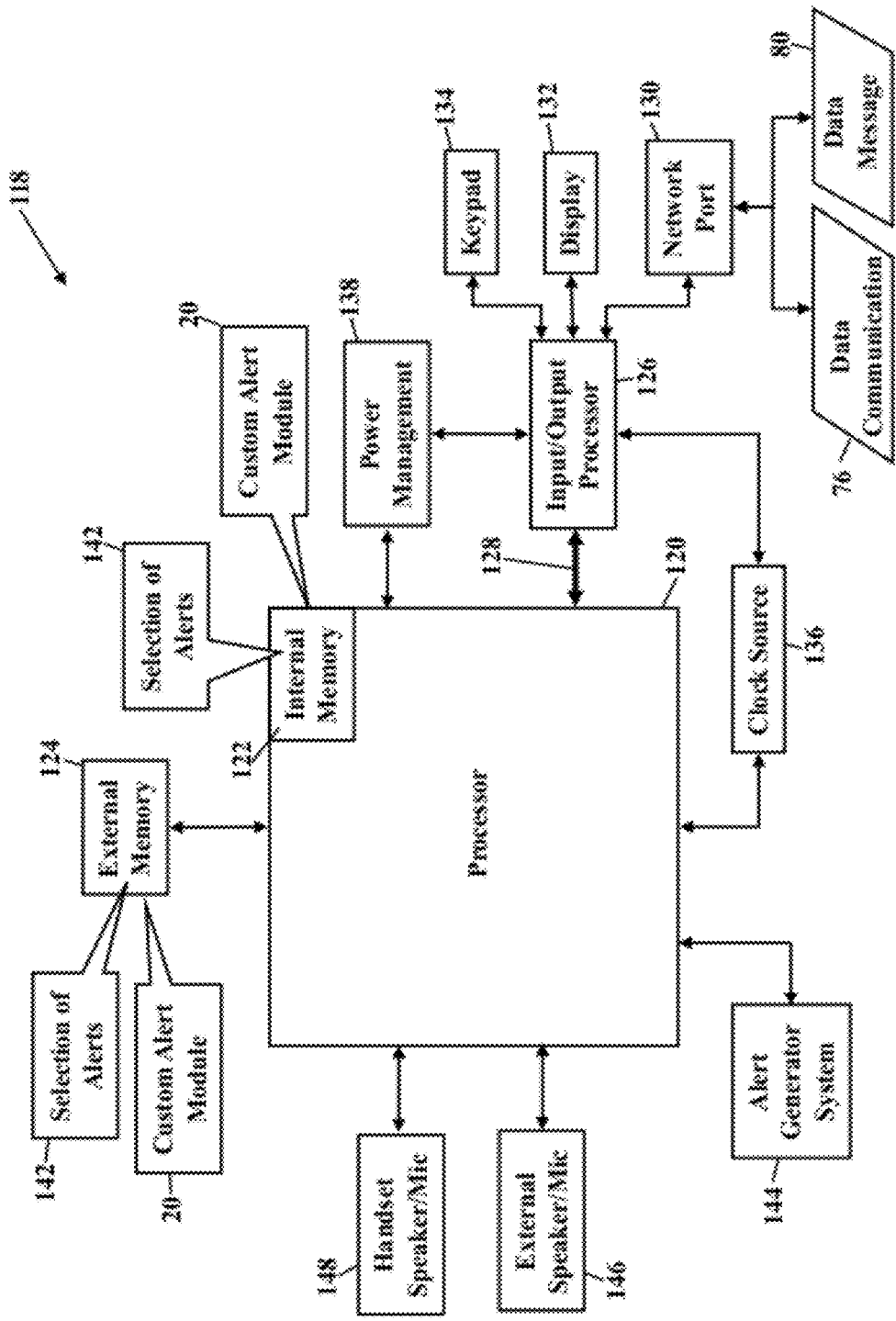
FIG. 9 is a block diagram of an apparatus embodying the exemplary embodiments.

FIG. 9 is a block diagram of an apparatus 118 embodying this invention. This apparatus 118 generates a custom alert for an incoming communication to the apparatus. The apparatus 118 could be embodied in a communications device, such as a personal digital assistant (PDA), a Global Positioning System (GPS) device, an interactive television, an Internet Protocol (IP) phone, a pager, a cellular/satellite phone, or any computer system and/or communications device utilizing a digital signal processor (DSP). The communications device may also include watches, radios, vehicle electronics, clocks, printers, gateways, and other apparatuses and systems. The apparatus 118 includes the custom alert module 20 operating within a memory device of a processor 120. The memory device could include internal memory 122 of the processor 120, or the memory device could include an external memory device 124 communicating with the processor 120. The processor 120 may convert analog signals to digital signals and may convert digital signals to analog signals. The processor 120 could include compression and decompression algorithms, cancellation algorithms, audio-processing circuitry, filter circuitry, and amplifier circuitry. Although processors can be designed to provide differing capabilities and a variety of performance criteria, the basic functions of the processor 120 are known and, thus, will not be further discussed.

The processor 120 interfaces with an input/output processor 126. The input/output processor 126 controls system I/O and may provide telephony-like control features. A bus 128 provides a signal communication path between the processor 120 and the input/output processor 126. The input/output processor 126 is a microprocessor that includes memory (not shown), communication controllers (not shown), and peripheral controllers (not shown). The communication controllers, for example, could control packet-based communications with a data network (shown as reference numeral 62 in FIGS. 2-6) through a network port 130. The peripheral controllers provide an interface with an LCD/LED/CRT display 132 and with control features, such as a keypad 134. A clock source 136 provides a system clock for the apparatus 118, and the clock source 136 may also include higher and lower frequency multiples of the system clock depending upon power requirements and power availability. A power management system 138 provides differing power control mechanisms, such as a sleep mode and a low-power mode, to efficiently utilize available power and to reduce thermal management concerns.

The apparatus 118 plays custom alerts for incoming communications. If, for example, the apparatus 118 communicates with the data network (shown as reference numeral 62 in FIGS. 2-6), the custom alert module 20 causes the apparatus 118 to play a custom alert to alert a user of the incoming communication 76. The network port 130 receives the data message 80 from the data network. The data message 80 could include information associated with an alert selected to accompany the incoming communication 76. When the data message 80 is received, the processor 120 interfaces with the custom alert module 20 and with the internal memory device 122 and/or the external memory device 124. The custom alert module 20 instructs the processor 120 to retrieve the selected alert from a selection of alerts 142 stored in the memory device. The alert is selected based upon the information contained within the data message 80 as previously discussed.

Once the alert is selected, the apparatus 118 presents the alert. The processor 120 interfaces with an alert generator system 144. The alert generator system 144 executes the selected alert file and provides the alert. The processor 120 and the alert generator system 144 could also interface with an external speaker/microphone (mic) system 146 to audibly present the selected alert. If the selected alert includes graphic or animation content, the processor 120 and the alert generator system 144 could also interface with the input/output processor 126 and with the display 132 to visually present the selected alert.

The custom alert module (shown as reference numeral 20 in FIG. 1) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the custom alert module to be easily disseminated. A computer program product for providing custom alerts for data communications comprises the computer-readable medium and the custom alert module. The custom alert module is stored on the computer-readable medium.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method for presenting a custom alert, comprising:
   receiving a data message at a recipient's communications device that specifies the custom alert associated with a data communication;
   receiving the data communication at the recipient's communications device;
   retrieving the custom alert from memory; and
   presenting the custom alert prior to receipt of the data communication to provide advance notice of the data communication.

2. The method according to claim 1, wherein presenting the custom alert comprises visually presenting the custom alert.

3. The method according to claim 1, wherein presenting the custom alert comprises audibly presenting the custom alert.

4. The method according to claim 1, further comprising retrieving the custom alert based on a time.

5. The method according to claim 1, further comprising retrieving the custom alert based on a day.

6. The method according to claim 1, further comprising retrieving a profile associated with a communications address.

7. The method according to claim 6, further comprising retrieving a rule from the profile.

8. The method according to claim 1, further comprising associating the custom alert with a communications address.

9. The method according to claim 8, wherein the communications address is a telephone number.

10. The method according to claim 8, wherein the communications address is an Internet Protocol address.

11. The method according to claim 1, further comprising associating the custom alert with a rule for at least one of an unknown communications address, a blocked communications address, and a private communications address.

12. The method according to claim 1, further comprising associating the custom alert with a rule for an out of area communications address.

13. The method according to claim 1, further comprising selecting the custom alert from a database.

14. The method according to claim 1, wherein the data communication comprises at least one of an email, a text message, and an instant message.

15. The method according to claim 1, further comprising associating the custom alert with at least a portion of a subject line of the data communication.

16. A system, comprising:
a processor;
memory; and
code stored in the memory that when executed causes the processor at least to:
receive a data message at a recipient's communications device, the data message specifying a custom alert associated with a data communication;
receive the data communication at the recipient's communications device;
retrieve the custom alert; and
present the custom alert prior to receipt of the data communication to provide advance notice of the data communication.

17. The system according to claim 16, further comprising code that causes the processor to select the custom alert based on a time.

18. The system according to claim 16, further comprising code that causes the processor to select the custom alert based on a day.

19. The system according to claim 16, further comprising code that causes the processor to select the custom alert according to a rule.

20. A computer readable medium storing processor executable instructions for performing a method, the method comprising:
receiving a data message at a recipient's communications device that specifies a custom alert associated with a data communication;
retrieving the custom alert from memory;
presenting the custom alert prior to receipt of the data communication to provide advance notice of the data communication; and
receiving the data communication at the recipient's communications device after presentation of the custom alert.

* * * * *